United States Patent [19]  [11]  4,007,545
Briggs  [45]  Feb. 15, 1977

[54] METHOD FOR ADJUSTING TEMPERATURE AND PRESSURE OF A FLUID

[75] Inventor: George Oliver Briggs, West Lake, Ohio

[73] Assignee: International Basic Economy Corporation, New York, N.Y.

[22] Filed: Jan. 14, 1972

[21] Appl. No.: 217,744

[52] U.S. Cl. .................................. 34/14; 34/17; 264/176 R
[51] Int. Cl.² .................... F26B 5/14; F26B 7/00
[58] Field of Search ............... 34/14, 17, 70, 183; 100/DIG. 8, 148, 117; 425/209, 382; 264/349, 176, 102, 101; 138/46

[56] References Cited

UNITED STATES PATENTS

| 1,098,247 | 5/1914 | Gibbs | 138/46 |
|---|---|---|---|
| 2,519,014 | 8/1950 | Bankey | 425/208 |
| 2,615,207 | 10/1952 | Dickey | 264/102 |
| 2,833,750 | 5/1958 | Vickers | 260/85.3 |
| 2,970,341 | 2/1961 | Mallory et al. | 425/380 |
| 3,031,030 | 4/1962 | Rodenacker | 264/102 |
| 3,035,306 | 5/1962 | Rossiter | 264/176 |
| 3,070,836 | 1/1963 | DeHaven et al. | 264/40 |
| 3,085,623 | 4/1963 | Ginaven et al. | 100/148 X |
| 3,158,900 | 12/1964 | Heston | 259/191 |
| 3,166,383 | 1/1965 | Morris | 34/10 |
| 3,222,797 | 12/1965 | Zies | 34/17 |
| 3,241,246 | 3/1966 | Pollock | 34/10 |
| 3,273,201 | 12/1966 | Reifenhauser | 425/201 |
| 3,285,163 | 11/1966 | Burner | 100/117 |
| 3,287,477 | 11/1966 | Ve Silind | 264/176 R X |
| 3,323,222 | 6/1967 | Skidmore et al. | 34/17 |
| 3,475,787 | 11/1969 | Heston | 425/203 X |
| 3,484,507 | 12/1969 | Smith | 425/209 X |
| 3,495,802 | 2/1970 | Fryklund | 138/46 X |
| 3,518,936 | 7/1970 | Bredeson | 100/148 X |
| 3,522,627 | 8/1970 | Vanzo | 425/201 |
| 3,550,201 | 12/1970 | Chapman | 425/201 |
| 3,613,160 | 10/1971 | Loomans et al. | 425/449 X |
| 3,761,061 | 9/1973 | Carron | 259/185 |
| 3,814,779 | 6/1974 | Wiley | 264/53 |
| R23,948 | 2/1955 | Fuller | 425/86 |

FOREIGN PATENTS OR APPLICATIONS

| 1,084,911 | 9/1967 | United Kingdom | 425/208 |
|---|---|---|---|
| 1,157,235 | 7/1969 | United Kingdom | 425/208 |
| 1,189,227 | 7/1967 | United Kingdom | 425/208 |
| 1,220,275 | 1/1971 | United Kingdom | 425/208 |
| 1,258,314 | 12/1971 | United Kingdom | 425/208 |

Primary Examiner—Charles J. Myhre
Assistant Examiner—William C. Anderson
Attorney, Agent, or Firm—Robert R. Jackson

[57] ABSTRACT

The pressure and temperature and in some cases the flow rate of fluids such as polymers are controlled by reducing the cross-sectional area of the conduit carrying the fluid to provide a flow channel communicating with the inner surface of the conduit whose cross-sectional area is less than that of the conduit. A valve housing is provided containing a chamber which communicates with the flow channel. The pressure and temperature and in some cases the flow rate of the fluid is controlled by adjusting the position of a valve member slideably disposed in the chamber. As the valve member slides within the chamber, it enlarges or reduces the cross-sectional area of the flow channel to change the flow resistance of the channel, thereby changing the pressure and temperature upstream of the channel and in some cases the flow rate through the channel.

In applications where the material at the upstream end of the channel is wet and at a substantially greater pressure than the downstream end, it is desirable to also provide an elongated chamber whose inlet port communicates with the downstream end of the channel and which contains means for advancing and compacting material emanating from the downstream end of the channel. In cases where fragmentation of the material is produced by a rapid, and sometimes explosive, vaporization of the moisture associated therewith upon exposure of the material to the low pressure at the downstream end of the channel, the chamber contains the explosion, collects the resulting fragmented materials and compacts the fragments into a form more convenient to handle.

4 Claims, 8 Drawing Figures

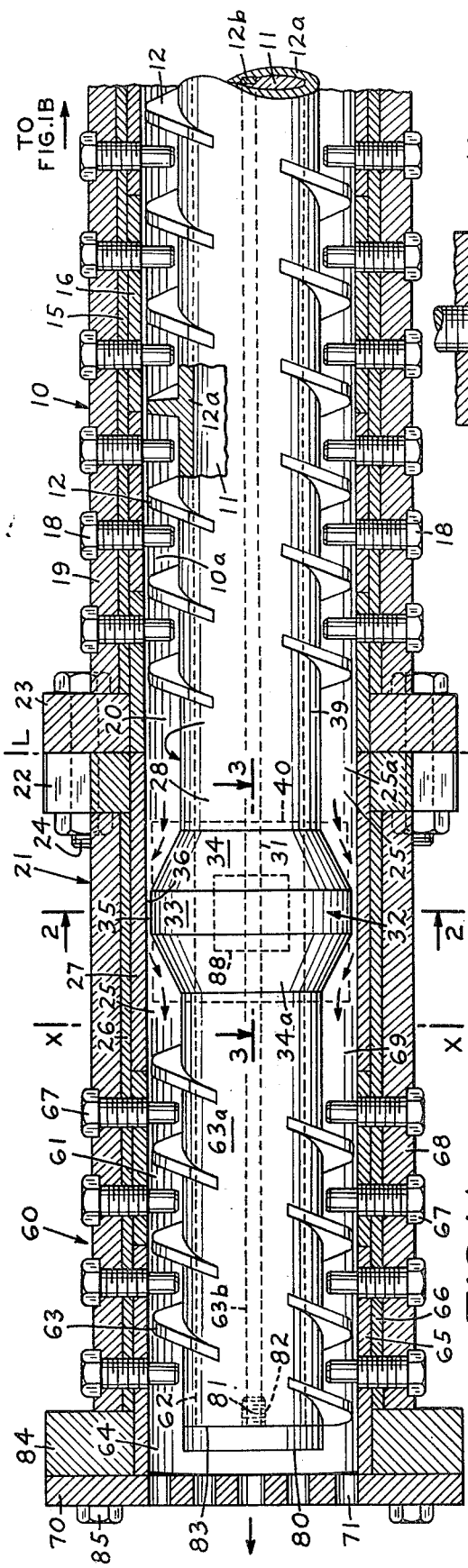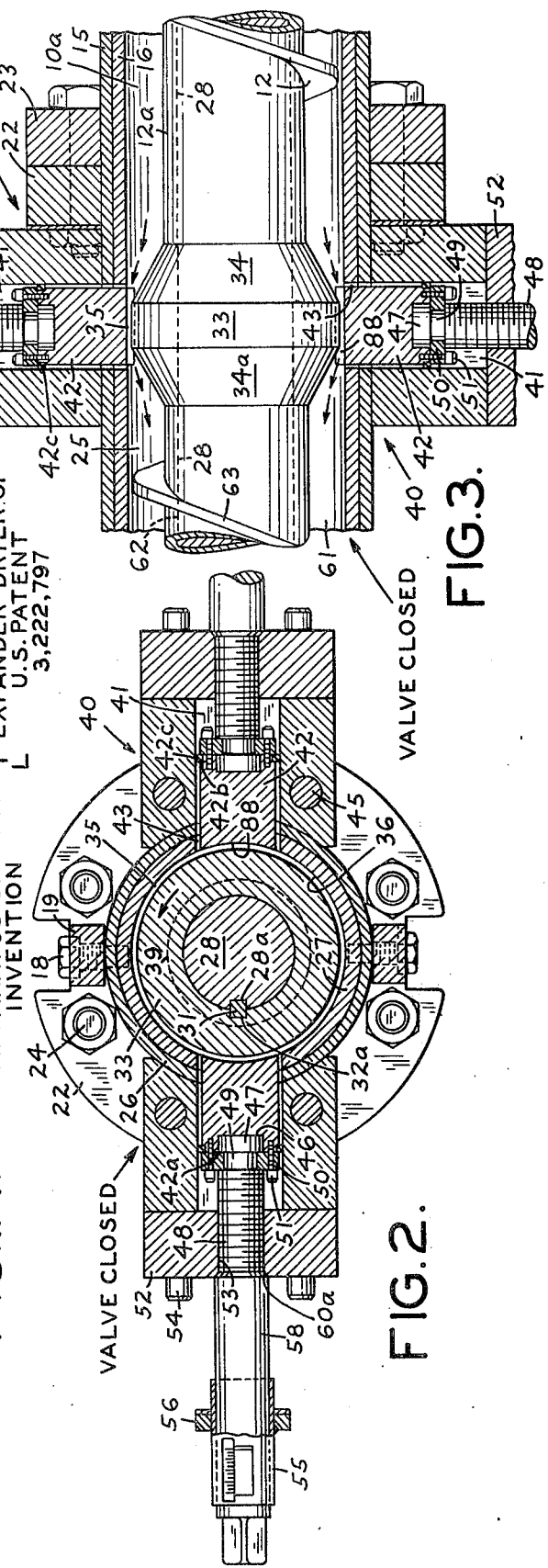
FIG.1A.
FIG.2.
FIG.3.

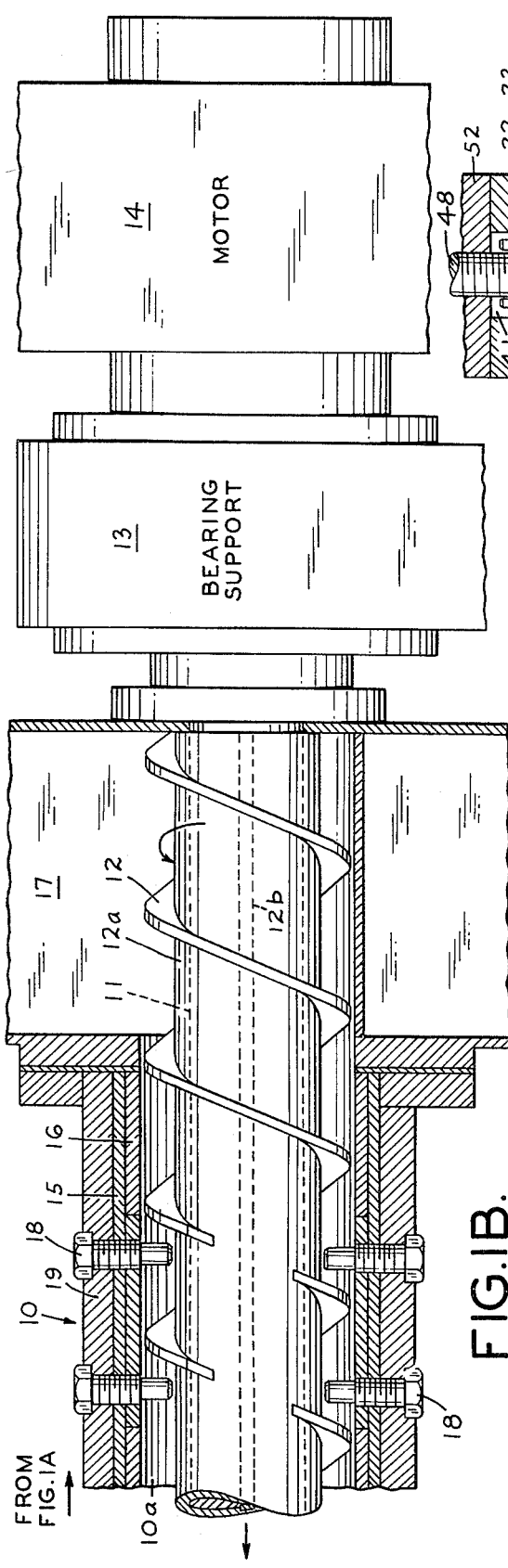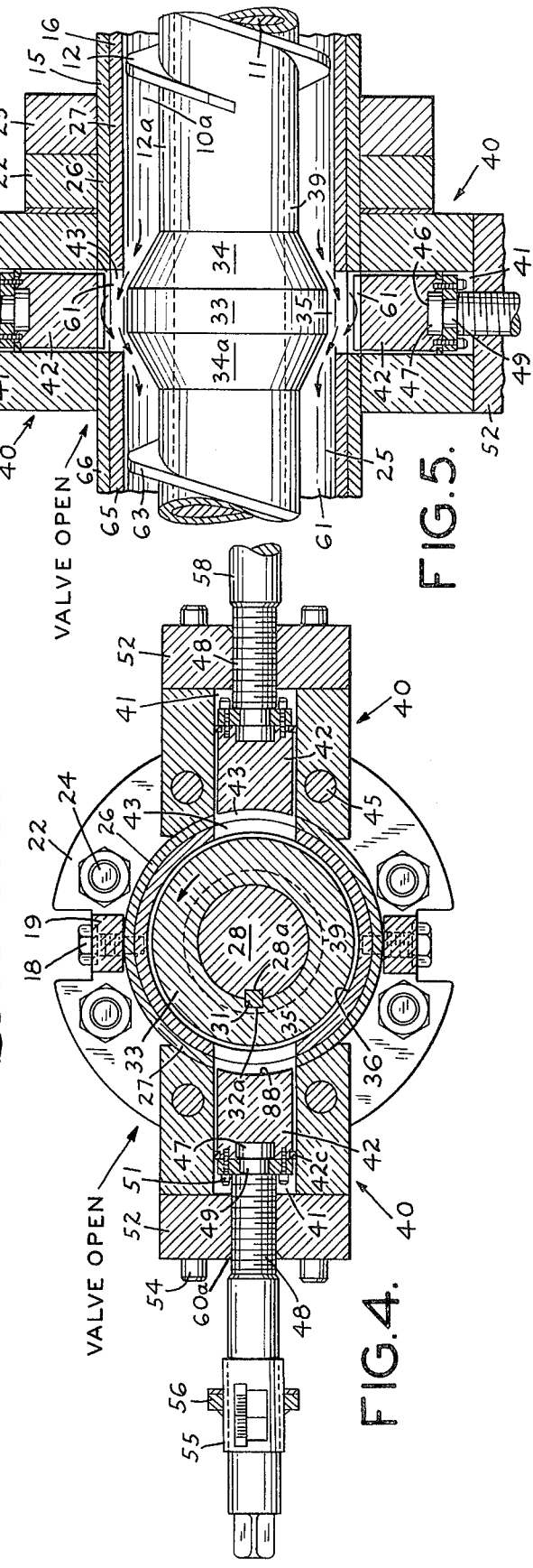

METHOD FOR ADJUSTING TEMPERATURE AND PRESSURE OF A FLUID

BACKGROUND OF THE INVENTION

This invention relates broadly to an apparatus and method for controlling operational parameters such as the pressure, temperature and in some cases the flow rate of a fluid and, in particular, for controlling these parameters when the fluid is a polymer. More particularly, the apparatus of this invention is a novel valve assembly, optionally modified with an extension on its downstream end for collecting and compacting material emanating from the valve. The valve assembly has numerous uses and is particularly suitable for use in polymer processing equipment in which the polymer is subjected to elevated temperatures and pressures. The valve assembly of this invention provides a means for quickly and conveniently accommodating such equipment to changes in the capacity and operational parameters which become necessary from time to time. The valve assembly is also advantageous in overcoming certain operational difficulties which occasionally affect such equipment.

A variety of equipment is available for processing polymeric materials at elevated pressures and temperatures. For purposes of clarity and illustration only, the apparatus and method of this invention will be described in connection with a single piece of processing equipment in commercial use at the present time. This equipment is commonly called an "Expander-dryer" and is commercially available from ANDERSON IBEC, Strongsville, Ohio, the assignee of this application. The "Expander-dryer" is fully described in U.S. Pat. No. 3,222,797 (see in particular FIGS. 1, 6–13 and the disclosure beginning in col. 7, line 36 of the U.S. Pat. No. 3,222,797. The term "Expander-dryer" as used herein means an apparatus of the type described in the U.S. Pat. No. 3,222,797.

The Expander-dryer has numerous uses but is particularly useful for drying synthetic and natural rubber-like polymeric materials such as butyl rubber, polybutadiene, polyisoprene, and the like. In such materials, the amount of water in the finished product is a critical production specification and ordinarily must be uniformly less than 0.5% and preferably less than 0.3%. Since many polymeric rubbers originally contain substantial amounts of water, e.g., 50% or more, the material must be thoroughly dried at some stage during its processing. The polymeric materials are typically dewatered to a moisture content of 5 to 20% using known equipment such as the Expeller press apparatus also described in the U.S. Pat. No. 3,222,797 and are then dried in the Expander-dryer to a product having less than about 0.5% moisture, using a unique drying procedure.

The Expander-dryer comprises (1) a processing chamber having an inlet and exit port, (2) means, such as a compaction worm assembly mounted on a rotatable shaft, for advancing the polymeric material through the processing chamber and for gradually building up the pressure within the chamber, (3) means for gradually increasing the temperature of the polymeric material as it passes through the chamber and (4) discharge means such as a die plate disposed at one end of the chamber in order to maintain suitable back-pressures in the processing chamber. As the polymer advances through the processing chamber, the temperature and pressure are progressively increased. A unique feature of the Expander-dryer is that a sufficiently high pressure is maintained within the processing chamber to prevent the moisture associated with the polymeric material from vaporizing within the chamber at the temperatures present in the chamber. This is accomplished by preventing release of the pressure built-up within the chamber through the cooperation of the composition worm assembly and the die plate.

As wet polymeric material is discharged from the processing chamber through the die plate, it enters a zone whose pressure is sufficiently low to cause the hot liquid present in the polymeric material to rapidly flash or vaporize. Some liquid is forcibly ejected from the polymer in droplet form at this point. The polymer and residual liquid contain sufficient B.T.U.'s to flash substantially all the residual liquid to vapor in the low pressure zone. Escape of the vaporized liquid from the polymer causes an expansion of the polymer to a porous structure (hence the name "Expander-dryer") which permits the continued evaporation of the liquid until a substantially dry polymer is obtained.

The discharge die plate commonly used with such apparatus is ordinarily an apertured plate with a fixed number of apertures and a fixed aperture size. As a result, if, as is often the case, it becomes necessary to adjust the capacity or other operational parameters of the Expander-dryer beyond that for which the die configuration is suitable, the apparatus must be shut down and a suitable change made to obtain the desired die configuration. This down-time can be costly and bothersome, and could be advantageously eliminated by a discharge plate which permitted the required adjustment of capacity or other operational parameters of the apparatus while it continued in operation.

Moreover, as pressurized heated polymer is discharged from the apparatus into the zone of reduced pressure, the moisture rapidly flashes to vapor, often with a violent and explosive force. In the case of polymers, such as styrene-butadiene and polybutadiene rubbers which have relatively low tensile strengths and viscosities, there is a marked tendency for at least a portion of the polymer to fragment, disintegrate, or otherwise subdivide into very fine particles typically having a dimension of 0.5 millimeters, or less. These fragmented materials are referred to in the art as "fines."

The "fines" present several problems. For example, they must be collected using hoods and other collection equipment to prevent undue contamination of the atmosphere. In addition to the loss of polymer caused by the fines, they also have a tendency to coat the surfaces of the hoods and collection equipment where, upon standing for prolonged periods of time, they degrade. The fines coating the inside surfaces also tend to pick up moisture from the environment. Since the hoods and collection equipment are necessarily in close proximity to the dried discharged product, great care must be taken to insure that these degraded or moistened fines do not find their way back into the dried product to contaminate it with degraded or moist material. Isolated specks of wet fines in a product can result, for example, in a product whose moisture content exceeds specification. A suitable means for safely and conveniently recovering, collecting and converting the fines to a form in which they could be more easily handled would be most advantageous.

It is, therefore, a general object of this invention to provide a valve assembly and method whereby the pressure, temperature and in some cases, the flow rate of a fluid-like material such as a polymeric material, can be quickly and conveniently adjusted and regulated without the necessity for interrupting the flow of the fluid or for shutting down the equipment through which the fluid is flowing.

It is another object of this invention to provide an apparatus and method for collecting and reagglomerating into a useful form the fines produced when a polymeric material is discharged from an Expander-dryer.

It is another object of this invention to provide an apparatus and method for preventing contamination of the dried polymeric product emanating from an Expander-dryer with degraded or moistened fines.

It is a further object of this invention to provide an apparatus and method for (1) controlling the pressure and temperature and in some cases also the capacity of an Expander-dryer without taking the equipment out of operation, (2) collecting and recovering fines discharged from such an Expander-dryer before they can pick up moisture, or degrade and (3) reagglomerating these collected fines into a form in which they can be more conveniently handled and used.

It is a still further object of this invention to provide an apparatus and method for adjusting the capacity and operational parameters of various types of known polymeric processing equipment such as extruders and the like.

These and other objects of this invention will be apparent to one skilled in the art from a total consideration of this disclosure.

SUMMARY OF THE INVENTION

The above objectives are obtained in accordance with the apparatus of this invention by providing a novel valve assembly for use in conjunction with polymeric processing equipment. In the valve assembly, flow restrictor means are disposed in the conduit through which a fluid is flowing to reduce the cross-sectional area of the conduit and provide a channel between a surface of the restrictor means and a surface of the conduit. The cross-sectional area of the channel is less than that of the conduit. At least one valve housing is provided which contains a chamber in communication with the channel. A valve member is slidably disposed within the chamber. Means are supplied for adjusting the position of the valve member within the chamber to thereby control the pressure and temperature and sometimes the rate of flow of material. Depending upon the position of the valve member in the chamber, the cross-sectional area of the channel can be increased or decreased to obtain the desired pressure and temperature upstream of the channel or in some cases the flow rate through the channel.

The valve assembly can be further provided with an elongated chamber having an inlet and exit port. The inlet end of the chamber communicates with the downstream end of the conduit. This downstream chamber collects fines discharged from the valve assembly in cases when the valve assembly is used in conjunction with an Expander-dryer which is processing a "fines producing" material. Means for compacting and advancing the fines through the elongated chamber toward its exit port are also provided.

The downstream chamber is desirably free from any obstructions which would cause a substantial disparity (i.e., about 50 psi or more) to exist between the pressure at the inlet port of the chamber and the discharge point of the downstream chamber during usage of the valve assembly. The pressure of the discharge point is less than that of the material upstream of the valve assembly, thus creating a low pressure zone in the vicinity of the inlet port of the chamber. When wet pressurized polymeric material is discharged from the downstream end of the valve assembly, it is discharged into this low pressure zone. The water flashes to vapor and the vapor escapes by passing through the chamber and through the exit port of the chamber, without recondensing on dried polymeric material flowing through the chamber.

If fines are to be reagglomerated by the compaction to which they are subjected in the elongated chamber, it is desirable to create a slight back pressure (less than about 50 psi) in the chamber. This is conveniently accomplished by mounting a die plate across the exit port of the elongated chamber which contains at least one aperture. The total cross-sectional area of all the apertures is sufficiently large, relative to that of the elongated chamber, that substantial pressure differences do not exist between the inlet and exit ports of the downstream chamber during usage of the valve assembly.

In accordance with the method of this invention, the pressure, temperature and in some cases the rate of flow of a material through a conduit is adjusted by providing in the conduit an obstruction for reducing the cross-sectional area of the conduit. The obstruction creates a channel between a surface of the obstruction and an inner surface of the conduit which has a cross-sectional area less than the conduit. The cross-sectional area of at least a portion of this channel is then increased to provide in said channel an enlarged portion to which material flowing through the channel has access.

The pressure and temperature upstream of the channel and sometimes the rate of flow of material through the channel are controlled by adjusting the cross-sectional area of the channel to alter the flow resistance of the channel as desired.

The apparatus and method of this invention are described in greater detail hereinbelow, in conjunction with the description of the preferred embodiments shown in the accompanying drawings.

BRIEF DESCRIPTION OF THE DRAWINGS

FIG. 1A is a partial side sectional view of the valve assembly of this invention (shown on the left side of FIG. 1A) used in conjunction with a prior art Expander-dryer (a portion of which is shown on the right side of FIG. 1A). A vertical dividing line L—L separates the prior art apparatus from that of this invention.

FIG. 1B is a side view, partly in section and partly in schematic, which is an extension from the right side of FIG. 1A and which shows additional structure of the prior art Expander-dryer.

FIG. 2 is a view, partly in section, taken generally along the line 2—2 of FIG. 1A and shows the valve assembly in its closed position.

FIG. 3 is a view, partly in section, taken generally along the line 3—3 of FIG. 1A and shows the valve assembly in the same closed position of FIG. 2.

FIG. 4 is a view identical to FIG. 2 except that it shows the valve assembly in an open position.

FIG. 5 is a view identical to FIG. 3 except it shows the valve assembly in an open position.

DESCRIPTION OF THE PREFERRED EMBODIMENTS

Figure 6:
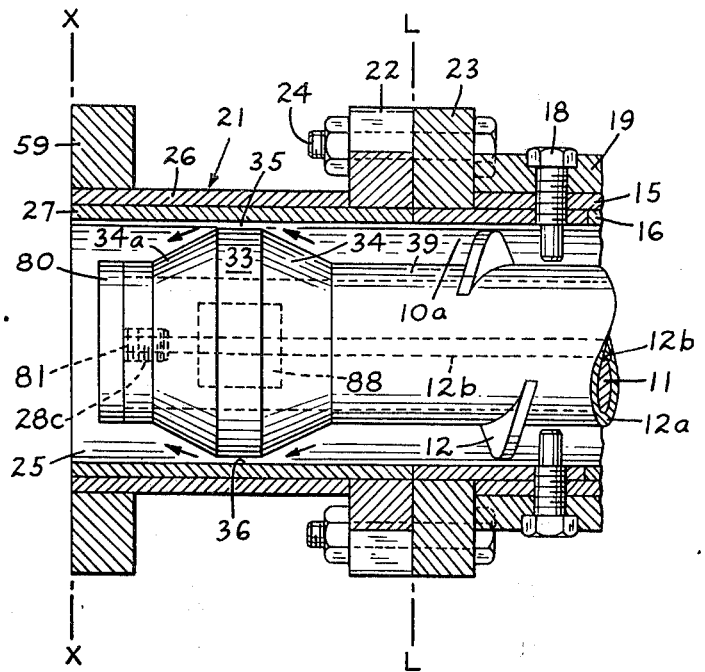
FIG. 6 is a modified embodiment of the apparatus of the invention similar to that shown in FIG. 1A with the compaction worm assembly on the left side of FIG. 1A omitted.

For illustrative purposes only, the apparatus of this invention is shown in use with the prior art Expander-dryer discussed hereinabove. Although some structure of the Expander-dryer must necessarily be shown, the reader is referred to U.S. Pat. No. 3,222,797 for a more detailed description of the Expander-dryer. The Expander-dryer is shown in FIG. 1B and in the right side of FIG. 1A which, for greatest clarity, should be placed side by side as indicated. Referring to FIGS. 1A and 1B, the Expander-dryer comprises an elongated cylindrical housing 10 containing a cylindrical conduit 10a in which is disposed a rotatable shaft 11. A compaction worm assembly comprising a plurality of worms 12 is removably mounted on shaft 11 by worm collar 12a (which is integral with worms 12) and key 12b, which fits into a keyway formed by cooperating axial grooves in the outer surface of shaft 11 and the inner surface of collar 12a (in a manner similar to that shown in FIGS. 2 and 4 and discussed in detail hereinbelow). Collar 12a is restrained from axial movement along shaft 11 by a shaft cap 80 (see FIG. 1A) discussed in greater detail hereinbelow. Shaft 11 is supported at one end by bearing structure 13 and rotatably driven by motor assembly 14, both shown schematically in FIG. 1B. Housing 10 comprises outer and inner annular metallic walls 15 and 16, respectively. Housing 10 is not vented so that pressure built up in conduit 10a is not released.

In operation, a rubbery polymeric material containing from about 5 to 20 percent water is fed to the Expander-dryer from a hopper through inlet chute 17 (FIG. 1B). The polymeric material is advanced into the conduit 10a by the rotating feed worms 12. As the material advances through the conduit 10a, it is compacted as a result of the gradually decreasing pitch of worms 12. The compacting action progressively increases the pressure in conduit 10a as the polymer advances through the apparatus. As the polymer enters conduit 10a, it is subjected to heated inner wall 16 and its temperature progressively increased as it proceeds through conduit 10a. Heat is supplied to wall 16 by any conventional means such as, for example, a steam jacket or high resistance electrical wiring (not shown).

Conduit 10a is provided with a plurality of breaker bolts 18, which extend into conduit 10a and are shown disposed on the top and bottom of housing 10 approximately 180° apart. Breaker bolts 18 are mounted in a bar 19 which is affixed to the outer surface of housing 10. The breaker bolts prevent the polymer from rotating with the worms 12 and collar 12a and increase the compaction of the polymer. The pressure in conduit 10a is maintained at a value which will insure that the moisture associated with the polymer remains in its liquid state. To cause the desired pressure build-up in conduit 10a, it is necessary to provide at the exit port 20 means for creating a back pressure in conduit 10a. Previously, this was ordinarily accomplished by the use of an apertured die plate as heretofore discussed. The valve assembly of this invention represents an improved means for creating the required back pressure and can be advantageously used to replace the die plate designated by numeral 79 in FIG. 6a of U.S. Pat. No. 3,222,797.

The valve assembly 21 of this invention (see the left side of FIG. 1A) is provided with an upstream flange 22 disposed adjacent the exit port 20 of the Expander-dryer and is mounted to a downstream flange 23 of the Expander-dryer by bolts 24, as shown in FIG. 1A. Valve assembly 21 comprises a conduit 25 of substantially the same dimension as the conduit 10a of housing 10. Conduit 25 communicates at its upstream end 25a with the exit port 20 of the Expander-dryer. Conduit 25 is defined by outer and inner walls 26, 27 similar to outer and inner walls 15 and 16 of the Expander-dryer.

Disposed within conduit 25 is a rotatable shaft 28 which cooperates with shaft 11 in such manner that shafts 28 and 11 rotate in unison. This cooperation can be achieved by making shaft 28 integral with shaft 11 as shown in FIG. 1A, or by coupling or otherwise affixing shaft 28 at its upstream end to the adjoining downstream end of a pre-existing shaft 11. One such technique for coupling the shafts together is shown in FIG. 7.

Figure 7:
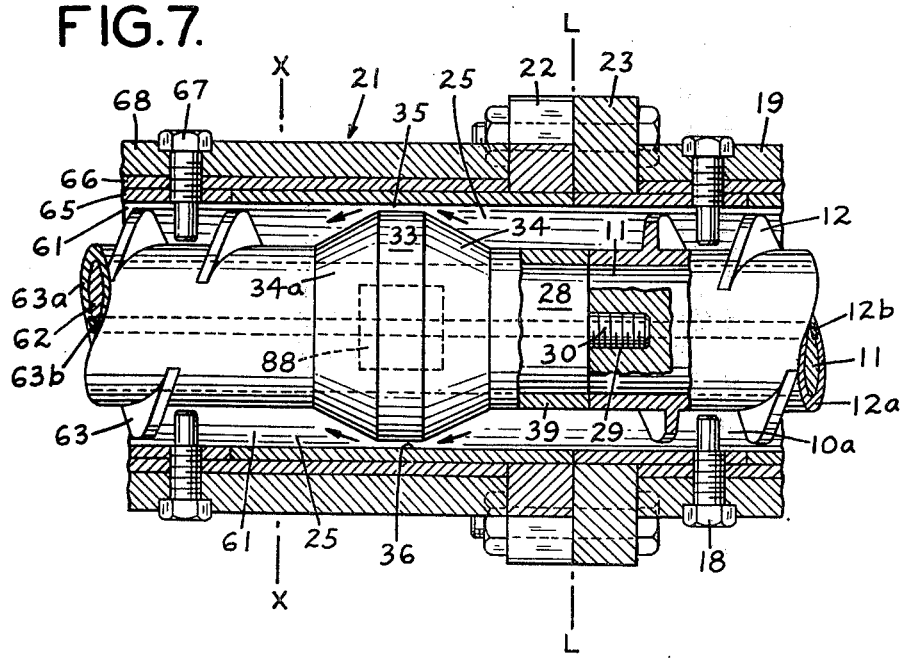
FIG. 7 is a view of a fragmentary portion of the apparatus of FIG. 1A and illustrates means for attaching the apparatus of this invention to existing equipment not provided with same.

Referring to FIG. 7, it is seen that the end of shaft 11 contains a threaded female recess 29 into which is threaded the male extension 30 of the upstream end of shaft 28. The direction of the threads is such that when shaft 11 rotates, the connection between the two shafts is tightened. If the valve assembly 21 is to be installed on a pre-existing Expander-dryer, shaft 28 is conveniently coupled to the end of shaft 11 as shown in FIG. 7. In the case of newly manufactured equipment, a similar arrangement can be used or a single integral shaft, as shown in FIG. 1A, can be provided throughout the entire length of the Expander-Dryer and the valve assembly 21.

Returning to FIG. 1A, the cross-sectional area of conduit 25 is reduced by the obstruction 32 mounted on shaft 28. As best shown in FIGS. 1A, 3 and 5, obstruction 32 comprises (i) a central cylindrical member 33 whose axis substantially coincides with that of cylindrical conduit 25 and (ii) two edge portions 34, 34a, which are integral with member 33 and conically taper toward the axis of member 33. AS shown in FIGS. 2 and 4, obstruction 32 is collar mounted on shaft 28 by a key 31 which fits into the keyway defined by groove 32a of obstruction 32 and cooperating longitudinal surface groove 28a of shaft 28. Portions 34 and 34a narrow into a cylindrical collar 39 which fits over shaft 28. Obstruction 32 is rotatable about its axis but is restrained from any longitudinal movement along its axis by shaft cap 80 (FIG. 1A), as discussed in more detail hereinbelow. Obstruction 32 is removably mounted on shaft 28 in order to permit rapid and convenient replacement by constructions of varying geometries.

Cylindrical member 33 creates a thin annular channel 35 between its outer peripheral surface and the inner surface 36 of wall 27. The cross-sectional area of channel 35 is less than that of the cross-sectional area of conduit 25. The thickness of annular channel 35 can vary considerably but is preferably substantially less than that of the radius of conduit 25. In one preferred embodiment, its thickness is about 1/32 of an inch.

As heated pressurized polymer is discharged from the exit port 20 of the Expander-dryer and into conduit 25 of valve assembly 21, it is deflected by the upstream conical portion 34 of obstruction 32 into the upstream end of annular channel 35 (see FIG. 1A). The polymer passes through channel 35, emerging at the downstream end of channel 35, and thereupon expands past downstream conical portion 34a back into conduit 25. It is thus seen that at least a portion of shaft 28, as represented by obstruction 32, has a cross-sectional area larger than that of the remainder of the shaft and that this enlarged portion of shaft 28 creates a flow channel 35 which communicates with the inner surface 36 of conduit 25.

A pressure gauge breaker screw (not shown) can be provided to facilitate the measurement of the pressure at the upstream end 25a of conduit 25.

As best seen in FIGS. 2 to 5, two valve housings 40, disposed at an angle of approximately 180° apart from each other are externally mounted on valve assembly 21. Housing 40 contains a chamber 41 in which a valve member 42 is slidably disposed. Aligned apertures 43 are provided in conduit walls 26 and 27 so as to provide communication between flow channel 35 and chamber 41 of the valve housing 40. Apertures 43 are sized to accommodate passage of valve member 42. Housing 40 is mounted to upstream flange 22 by bolts 45.

Valve member 42 contains a recess 46 which is adapted to receive the end plug 47 of threaded cylindrical valve control rod 48. Rod 48 contains a narrowed neck portion 49, one end of which is attached to end plug 47. A split ring collar 50 envelops neck portion 49 and is affixed to the adjacent surface 42a of valve member 42 by screws 51. Surface 42a of valve member 42 contains a peripheral groove 42b in which is disposed a sealing gasket 42c. The surface 88 of valve member 42 which communicates with channel 35 is slightly curved so that in the closed position it will be substantially flush with the inner surface 36 of conduit 25.

A valve rod retainer plate 52 is affixed to a surface of the valve housing 40 by screws 54. Plate 52 contains a threaded chamber 53 which communicates with chamber 41 and which is designed to accommodate rod 48. Rod 48 is threaded to cooperate with the threads provided in chamber 53. As rod 48 is rotated in one direction, it is withdrawn from plate 52 simultaneously retracting valve member 42 through chamber 41 to thereby open the valve. As rod 48 is rotated in the opposite direction, valve member 42 is caused to reverse direction in chamber 41 and advance in the direction of channel 35 to close the valve. A scale 55 is mounted on bracket 56 and serves to accurately control the degree to which the valve is opened or closed.

FIGS. 2 and 3 show the valve in its fully closed position. In this position, valve member 42 does not enter channel 35 (see FIG. 2). Thus, some degrees of flow can occur through channel 35 even when the valve is in the closed position. Valve member 42 is prevented from entering channel 35 by the enlarged section 58 of valve control rod 48 which seats in the annular bevel 60a of plate 52 as rod 48 is rotated to close the valve. Since the enlarged end 58 of control rod 48 is too large to pass through chamber 53 of plate 52, movement of valve member 42 ceases when portion 58 reaches bevel 60a. The enlarged end 58 is spaced on rod 48 to insure that valve member 42 stops when the curved surface 88 of valve member 42 is substantially flush with the inner surface 36 of conduit 25.

FIGS. 4 and 5 show the valve in an opened position. Referring to these Figures, it is seen that by retracting valve members 42 the cross-sectional area of at least a portion of channel 35 is enlarged radially outward from the axis of conduit 25 to provide an enlarged portion of channel 35 to which material flowing through channel 35 has access. The enlarged portion comprises the chamber defined by the apertures 43 in inner and outer walls 27, 26 and that portion of chamber 41 which communicates with apertures 43. As shown in FIGS. 4 and 5, member 42 has not been fully retracted so that the enlarged portion of channel 35 comprises only apertures 43. Were member 42 to be further withdrawn, it is apparent that the enlarged portion of channel 35 would be even further increased to include a portion of chamber 41.

It can be seen that the cross-sectional area of channel 35 is adjusted solely by adjusting the volume of this enlarged portion. The volume of the enlarged portion will vary depending upon the extent to which valve member 42 has been withdrawn. As valve member 42 is withdrawn, polymeric material flowing through channel 35 will have access to the enlarged portion created thereby thus, in effect, increasing the cross-sectional area of channel 35 to reduce the flow resistance offered by the valve as long as valve member 42 is withdrawn. As valve member 42 is urged toward channel 35, polymeric material present in chamber 41 and apertures 43 is expelled into channel 35 and the enlarged cross section of channel 35 is reduced, thereby increasing the flow resistance offered by the valve.

Although valve member 42 is prevented from entering channel 35 in the preferred embodiment shown in the drawings, it will be apparent that the valve assembly could be readily modified to allow valve member 42 to protrude into channel 35 for as great as desired. Thus, the length of the threaded portion of rod 48 could be extended by reducing the length of portion 58 to thereby allow valve member 42 to extend further into channel 35. In the case where valve member 42 does extend into channel 35, the enlarged portion of said channel referred to hereinabove comprises the channel itself, apertures 43 and the portion of chamber 41 which communicates with apertures 43.

It is thus seen that the valve structure of this invention allows the flow resistance in polymeric processing equipment to be adjusted in order to accommodate the equipment to an adjusted capacity or adjusted operational parameters such as upstream temperature or pressure without the need for discontinuing the use of the equipment or halting the flow of polymer through the equipment. It is apparent that the cross-sectional area of channel 35 can be widely varied depending upon the dimensions of valve member 42 and the extent to which member 42 is withdrawn. In designing the valve assembly, accommodations can be made to provide the desired range of flow rates and operational parameters which are foreseeable for the piece of equipment with which the valve is to be used. The valve will remain permanently mounted on the equipment and changes in capacity or operational parameters can be quickly and conveniently accommodated by simply adjusting the cross-sectional area of channel 35 to the appropriate degree.

When the valve assembly is used in conjunction with an Expander-dryer, it is, on occasion, desirable to further provide an elongated chamber which communicates with the downstream end of channel 35. This chamber will contain the fines produced by the explosive forces generated when the polymer emerges from channel 35 into the low pressure zone and prevents them from scattering. By including within the chamber a means for compacting and advancing the fines through the chamber, the fines are reagglomerated and discharged in a useful form.

To this end, there is shown in FIG. 1A an elongated cylindrical chamber 60, which contains a conduit 61 which is in communication with equal dimensioned conduit 25 of valve assembly 21. As shown in FIG. 1A, valve assembly 21 and elongated chamber 60 appear as an integral unit. In cases where fines are not a problem, the elongated chamber is not required and the valve assembly 21 is provided as a separate unit connected at its upstream end to the Expander-dryer as shown in FIG. 6. In FIG. 6, valve assembly 21 is provided with a downstream flange 59. If desired, an elongated chamber 60 can be provided with an upstream flange for coupling to flange 59 in cases where fines are a problem. For this contingency, shaft 28 is also provided with a removable cap 80 similar to that shown in FIG. 1A which is threaded into the recess 28c at the end of shaft 28.

Thus, valve assembly 21 and elongated chamber 60 can be integral or separated as desired. The ensuing description is with reference to FIG. 1A in which the valve assembly 21 and chamber 60 are integral. Although valve assembly 21 and chamber 60 share in common a number of features such as the central conduit and the conduit walls, the common features have been separately numbered to maintain a distinction between the valve assembly 21 and chamber 60 since, in certain cases, they could be separable from each other along vertical line X—X of FIG. 1A and as indicated by FIG. 6.

Referring to FIG. 1A, it is seen that conduit 61 contains disposed therein a rotatable shaft 62 on which is collar mounted a compaction worm assembly (similar to worm assembly 12 on the right side of FIG. 1A) comprising a plurality of compaction worms 63. The worm collar 63a is mounted on shaft 62 by a key-keyway arrangement 63b identical to that shown in FIGS. 2 and 4. Preferably, the pitch of worms 63 progressively decreases as the worms approach the exit port 64 of conduit 61. Conduit 61 is provided with inner and outer walls 65, 66, similar to walls 26, 27 and 15, 16. Chamber 60 also contains a plurality of breaker bolts 67 mounted in breaker bolt bar 68. The breaker bolts are disposed in an upper and lower row spaced approximately 180° apart. Two or more rows could be added if desired to create four rows 90° apart. Worms 63 extend only about ¾ths of the way around the periphery of shaft 62 so as to not contact breaker bolts 67 as shaft 62 rotates. Breaker bolts 67 serve the same function as the breaker bolts 18 of the Expander-dryer.

As shown in FIG. 1A, shaft 62 is integral with shaft 28 and rotates in unison with shaft 28 in response to the rotation of shaft 11. If chamber 60 were a separate unit, shaft 62 could be coupled or otherwise fixed at one end to the adjoining end of shaft 28 in a manner similar to that shown in FIG. 7.

Worm assemblies 63 and 12, as well as obstruction 32 are restrained from longitudinal movement along shafts 62, 11 and 28, respectively, by shaft cap 80. Cap 80 is a cylindrical member whose outside diameter is approximately the same as that of the collars of worm assemblies 63 and 20. It is held in place at the end of shaft 62 by a threaded male projection 81 which cooperates with the threaded recess 82 in the surface 83 of shaft 62.

Conduit 61 is free from any obstructions which would cause a substantial disparity to exist between the pressure at its inlet port 69 and discharge port 64. The reason for this is that the hot pressurized polymeric material must emanate from the downstream end of channel 35 into a zone which is maintained at a sufficiently low pressure to allow the liquid associated with the polymer to rapidly flash into vapor. Since inlet port 69 communicates with the low pressure atmosphere normally surrounding the equipment (through conduit 61 and, when discharge plate 70 is used, through apertures 71 in plate 70), the pressure at exit port 69 should be substantially the same as that at exit port 64. (In this regard, chamber 60 could also be provided with ventilation apertures or slots.) Polymer discharged from channel 35 then loses its moisture by evaporation and the evaporated moisture passes down conduit 61 and discharges to the atmosphere. If, for any reason, the pressure at inlet port 69 was sufficiently high to prevent moisture in the polymer discharged from channel 35 from vaporizing, effective drying of the polymer would not be obtained. Moreover, even if the moisture was vaporized, the possibility would exist that the moisture could condense back onto the polymer in conduit 61 if excessively high pressures were present at any point in conduit 61. To preclude these undesirable effects, it is preferable that the pressure at the inlet and exit ports 64, 69 of conduit 61 not vary substantially and that the pressure at inlet port 69 be sufficiently low to permit vaporization of the liquid carried by the polymer.

As the polymer emanates from channel 35, the normal product and any fines generated by this explosive vaporization of liquid are confined and collected by conduit 61 and are transported from the inlet port 69 of conduit 61 to the exit port 64 by compaction worms 63. Worms 63 exert a mild compacting pressure on the fines which reagglomerates the fines into an easier to handle form. It has been found that a small amount of back pressure is desirable in conduit 61 to assist in the agglomeration of the fines. For this purpose, a discharge plate 70 can be optionally attached to downstream flange 84 across exit port 64 of conduit 61 by bolts 85. Generally, plate 70 contains one or more apertures 71; however, the total cross-sectional area of the apertures must be sufficiently large, relative to that of conduit 61, that substantial pressure differences do not exit between the inlet and exit ports of conduit 61 during usage. Generally, the elongated chamber 60 of this invention is designed so that exit port 64 communicates with an environment which is either at atmospheric or subatmospheric pressure, and wherein the pressures present in conduit 61 during operation are less than about 50 p.s.i. and preferably within the range of from about 10–50 p.s.i.

The specific embodiments, drawings and detailed descriptions presented hereinabove are illustrative only and such alterations and modifications thereof as would be suggested to one skilled in the art are deemed to fall within the scope and spirit of the claims appended hereto.

What is claimed is:

1. A method for adjusting the upstream pressure or temperature of a moist polymeric material flowing through a conduit, or the flow rate of said material, said material being under sufficient pressure to prevent the moisture from vaporizing at the temperature of the material, which comprises:

1. passing the material through a channel defined by an inner wall of the conduit and an obstruction having a substantially smooth outer surface located within the conduit, said channel having a cross-sectional area less than that of said conduit and an upstream and downstream end, the upstream end communicating with said pressurized polymeric material;
2. enlarging the cross-sectional area of at least a portion of said channel radially outward to provide an enlarged portion thereof to which material flowing through said channel has access, said enlarged portion comprising a chamber which communicates with said channel;
3. adjusting the resistance to the flow of material through the conduit by adjusting the volume of said chamber;
4. conducting the material emanating from the downstream end of said channel into a zone wherein the pressure is sufficiently low to permit substantially all the moisture associated with the material to immediately vaporize and immediately expand the material to the full extent required for said vaporization thereby drying the material; and
5. compacting the dried material under pressures sufficiently low to prevent condensation of the vapor released from the material back onto the material.

2. The method of claim 1 wherein said moist polymeric material contains from about 5 to 20 percent moisture, said dried material contains less than about 0.5 percent moisture, and the pressure in said zone and during the compaction step is less than about 50 p.s.i.

3. A method for adjusting the upstream pressure or temperature of a moist polymeric material flowing through a conduit, or the flow rate of the material, the material being under sufficient pressure to prevent the moisture from vaporizing at the temperature of the material, which comprises:

1. passing the material through a channel in the conduit defined by an inner wall of the conduit and an obstruction having a substantially smooth outer surface located within the conduit, said channel having an upstream and downstream end;
2. moving a valve member located within a chamber disposed externally of the channel, which chamber communicates with the channel, along an axis generally normal to the conduit wall, to permit more or less material flowing through the channel to pass from said channel into said chamber;
3. conducting the material emanating from the downstream end of the channel into a zone in which the pressure is sufficiently low that substantially all the moisture associated with the material rapidly flashes to vapor and the material immediately expands to the full extent required for said flash vaporization thereby releasing the vapor from the material and drying the material; and
4. compacting the dried material under pressures sufficiently low to prevent condensation of the vapor releases from the material back onto the material.

4. The method of claim 3 wherein the moist polymeric material contains about 50 to 20 percent moisture, the dried material contains less than about 0.5 percent moisture, and the pressure in the vaporization zone and during compaction is less than about 50 p.s.i.

* * * * *